United States Patent Office 2,704,776
Patented Mar. 22, 1955

2,704,776

PROCESS FOR MAKING OF FLUOROCARBON DERIVATIVES

James D. La Zerte, St. Paul, Wilbur H. Pearlson, Bald Eagle, and Edward A. Kauck, St. Paul, Minn., assignors to Minnesota Mining & Manufacturing Company, St. Paul, Minn., a corporation of Delaware No Drawing. Application February 24, 1953, Serial No. 338,602

3 Claims. (Cl. 260—653)

This application is a continuation-in-part of our earlier application Serial No. 211,792, filed February 19, 1951, now U. S. Patent No. 2,647,933, and the disclosure thereof is incorporated herein directly and by reference.

The present invention relates to a new and improved method of making fluorocarbon bromides, such as may be illustrated by the formula $R_fBr$, where $R_f$ is a fluorocarbon radical.

Fluorocarbon bromides have previously been made, by one method or another. For example, see Waterman U. S. Patent No. 2,531,372; Simons et al. U. S. Patent No. 2,506,652; an article entitled "Fluorocarbon bromides" by Brice et al., appearing in the Journal of the American Chemical Society, vol. 68, pages 968–969 (June 1946); an article appearing in the Journal of the American Chemical Society, vol. 64, pages 1157–1159 (1942); and an article appearing in the Journal of the American Chemical Society for December 1940, pages 3477 and 3480. It will be noted that the Waterman U. S. Patent No. 2,531,372 suggests producing trifluorobromomethane (which is a fluorocarbon bromide) by heating a mixture of carbon tetrabromide, antimony trifluoride and bromine to a temperature of 180–220° C. under a pressure of 60–80 pounds gauge for a period of time. Simons et al. U. S. Patent No. 2,506,652 reacts a fluorocarbon, i. e., $C_nF_{2n+2}$, with bromine to effect brominolysis of the same, i. e., splitting the molecule of starting material at a carbon-to-carbon bond, thus making two molecules of the fluorocarbon bromide per molecule of starting material.

The foregoing and other methods tried in the prior art have drawbacks in comparison with the method of our present invention. We have found that we can successfully and efficiently produce fluorocarbon bromides by reacting bromine with the corresponding fluorocarbon acid. The reaction may be indicated as:

REACTION 1

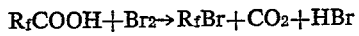

$$R_fCOOH + Br_2 \rightarrow R_fBr + CO_2 + HBr$$

We have also found that instead of using the acid, we may employ the corresponding anhydride and react it with bromine. This reaction may be indicated as follows:

REACTION 2

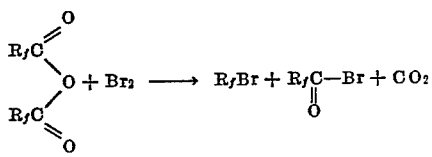

It will be noted that, in addition to the desired $R_fBr$, the above reaction also yields a perfluoro acid bromide, i. e.,

We have also found (and it is this aspect of our discoveries to which the present application is particularly directed) that the last-mentioned compound can readily be converted to the desired fluorocarbon bromide by heating, as indicated by the following equation:

REACTION 3

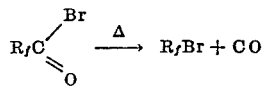

Reaction 2, when followed by Reaction 3, makes for more economical use of bromine than does Reaction 1. Reaction 3 thus permits the obtaining of two mols of fluorocarbon bromide from one mol of the corresponding anhydrides. Where desired, the reaction of the anhydride with bromine, and the conversion of the perfluoro acid bromide to the desired fluorocarbon bromide by heat, can be accomplished as a single operation, thus, in effect, producing two mols of fluorocarbon bromide from one mol of the corresponding perfluoro acid anhydride.

Fluorocarbon acids are readily available by processes heretofore disclosed. For example, the basic electrochemical process of the Simons U. S. Patent No. 2,519,983 will directly yield perfluoro acid fluorides, such as the $CF_3COF$ (trifluoroacetyl fluoride) disclosed in column 18 of the patent.

The fluorocarbon acid fluorides can be converted to the corresponding bromides by vapor phase reaction with metallic bromide at elevated temperatures. Other methods of producing perfluoro acid bromides involve the reaction of (1) red phosphorus and bromine with fluorocarbon acids, and (2) sodium bromide with fluorocarbon anhydrides.

The subject matter of Simons U. S. Patent No. 2,519,983 was disclosed to the public a considerable period of time prior to the grant of the patent, as will be seen from the specification of that patent, column 1, lines 22–36. Trifluoroacetic acid (an example of a fluorocarbon acid), made by other processes was known a considerable time prior to Simons' date of invention; for example, see Bull. Sci. Acad. roy. Belg., volume 8, pages 343–70 (1922), Chem. Abs., volume 17, page 769 (1923), which discloses trifluoromethylcyclohexanone and the oxidation thereof to trifluoroacetic acid. Thus it will be apparent that trifluoroacetic acid, a perfluoro acid, has been available for a great many years, and it also will be apparent that various other fluorocarbon acids have also been available for a considerable period of time. It will also be clear that processes for converting acids to acid bromides have been available for an even longer time.

As will be apparent from what has already been said, an important object of our invention is to provide an improved method of making fluorocarbon bromides. Another object is to provide a method of producing fluorocarbon bromides which provides high yields. A further object is to provide a process by which a wide range of fluorocarbon bromides can be produced. Still another object of our invention is to provide a process where the position of the bromine in the final product molecule can be determined very definitely, by virtue of the choice of starting material. These and other objects and advantages will appear from the application taken as a whole.

Fluorocarbon carboxylic acid bromides can be readily converted to the corresponding bromides, according to our invention, by passage through a heated furnace at relatively low temperatures, which, however, are substantially above normal atmospheric temperatures. While the reaction proceeds in an empty tube, the addition of various catalysts provides certain advantages, one being increased yields.

The exact temperature varies with the acid bromide used, the yield desired, and the space velocity, but temperatures of 250° to 750° C. or 800° C. are feasible. Below about 250° the reaction rate becomes quite slow; at temperatures above 800° C., secondary pyrolytic processes cause a decrease in yield.

In order to illustrate our invention in various specific respects, and also the preparation of the acid bromides, a number of specific examples will now be disclosed. Examples V, VI, VII and VIII illustrate the method or process herein claimed, while Examples I, II, III and IV illustrate the preparation of our starting materials.

Example I

To a mixture of 107 grams of perfluorobutyric acid and 4 grams of red phosphorus was added 80 grams of bromine over a sufficient period of time to prevent the resulting exothermic reaction from becoming too vigorous. The mixture was then allowed to stand over night, after which it was then refluxed one hour. The acid bromide product was removed by distillation. To the portion which distilled to 60° was added mercury to remove elemental bromine. Redistillation yielded a clear liquid boiling at 52 to 54° at 748 millimeters and having a refractive index ($N_D^{20}$) of 1.3261 and a density ($D_4^{20}$) of 1.735.

Example II

To 20.6 (0.2 mol) NaBr was added 82 grams (0.2 mol) perfluorobutyric acid anhydride. No heat of reaction was observed. The mixture was refluxed over night following which crude product was obtained boiling at 55° C. An additional 20.6 grams of NaBr was added and distillation continued. Total yield of 28 grams of crude product was obtained, from which 20 grams of pure acid bromide were obtained boiling at 53° at 736 millimeters.

Example III

A mixture of 20 grams perfluorobutyryl fluoride, 35 grams $C_3F_6$, 10 grams $AlBr_3$ and 3 grams of activated carbon was heated 60° for 48 hours in a sealed ampoule. 1 gram of product was obtained boiling in the neighborhood of 56° C. and containing 30% hydrolyzable bromide. (Theory for perfluorobutyryl bromide—28.9%.) The infrared spectrum showed the band characteristic of the acyl bromide group.

Example IV 11 grams of trifluoroacetyl fluoride was passed over 47 grams of a mixture of calcium bromide and sodium fluoride contained in a carbon tube maintained at an outside temperature of 600° C. The flow rate was 0.16 mols per hour and the contact time about 6 seconds. In addition to the trifluoroacetyl bromide product, there was also obtained approximately 25% unreacted trifluoroacetyl fluoride and by-products such as $SiF_4$ and $CF_3Br$.

Example V 14.3 grams of $C_3F_7COBr$ was passed through an empty carbon-lined tube heated to 550° (temperature inside of the tube). After removal of a small amount of free bromine by treatment of the products with mercury, a total of 8.1 grams of condensible material was recovered. Infrared spectral analysis indicated that this product was a mixture of $C_3F_7Br$ and unconverted $C_3F_7COBr$. Approximately equimolar quantities of each were present. On the basis fo carbon monoxide recovered, a 60% conversion of the acid bromide had resulted. The yield of $C_3F_7Br$ was at least 40%.

Example VI 49.5 grams (0.24 mols) of perfluoroacetic anhydride was reacted with 64.0 grams (0.40 mols) of bromine, in a carbon-lined tube filled with active carbon at a temperature of 300° C. The products, consisting of $CF_3Br$ and $CF_3COBr$, were then separated and the acid bromide pyrolyzed in an empty carbon-lined tube at 650° C. to produce substantially quantitative yields of $CF_3Br$.

Example VII 39 grams $CF_3COBr$ was passed through a carbon-lined tube kept at a temperature of 650° C. 28.7 grams product $CF_3Br$ was obtained having an average molecular weight of 149 (theory=149).

Example VIII 422 grams (1.03 mols) of $(C_3F_7CO)_2O$ and 280 grams (1.75 mols) of bromine were passed through a carbon tube containing active carbon and maintained at a temperature of 350° C. There was obtained 340 grams of $C_3F_7Br$ and only 8 grams of $C_3F_7COBr$.

Examples VI and VIII are illustrative of cases wherein Reactions 2 and 3, previously described, are combined in a one-step process, thus effectively utilizing the bromine reactant and producing a maximum yield of fluorocarbon bromide product.

Other acid bromides which can be converted to the corresponding fluorocarbon bromide include $C_4F_9COBr$, perfluorocyclohexylcarboxylic acid bromide, perfluoro octanoic acid bromide and perfluoro decanoic acid bromide.

Whereas the pyrolysis of only monocarboxylic acid bromides is illustrated in the foregoing examples, our method is also intended for use with the acid bromides of dicarboxylic acids, as, for example, perfluorosuccinic, perfluoroadipic and perfluorocyclohexane-1, 3-dicarboxylic acid bromides.

Reactors can be constructed of any materials such as steel, graphite, glass, porcelain, platinum, etc.

While our method has been illustrated hereinabove in connection with certain specific fluorocarbon acid bromides, we do not intend that we should be limited to them.

What we claim is:

1. The method of making fluorocarbon bromides which comprises heating

to decomposition temperatures, where $R_f$ is a perfluorocarbon radical.

2. The method of making perfluorocarbon bromides which comprises heating

to a decomposition temperature within the range of about 250° to 800° C., $R_f$ being a perfluorocarbon radical.

3. The method of making $CF_3Br$ which comprises heating

to a decomposition temperature within the range of about 250°–800° C.

No references cited.